United States Patent
Cousins (10) Patent No.: US 9,118,478 B2
(45) Date of Patent: Aug. 25, 2015

(54) FAULT-TOLERANT DATA TRANSMISSION SYSTEM FOR NETWORKS WITH NON-FULL-DUPLEX OR ASYMMETRIC TRANSPORT

(71) Applicant: Saratoga Data Systems, Inc., Saratoga Springs, NY (US)

(72) Inventor: Robert Cousins, Saratoga, CA (US)

(73) Assignee: Saratoga Data Systems, Inc., Saratoga Springs, NY (US)

( * ) Notice: Subject to any disclaimer, the term of this patent is extended or adjusted under 35 U.S.C. 154(b) by 192 days.

(21) Appl. No.: 14/065,071

(22) Filed: Oct. 28, 2013

(65) Prior Publication Data

US 2015/0121161 A1     Apr. 30, 2015

(51) Int. Cl.
*H04L 1/00*     (2006.01)
*H04L 1/18*     (2006.01)

(52) U.S. Cl.
CPC ............. *H04L 1/1858* (2013.01); *H04L 1/0009* (2013.01)

(58) Field of Classification Search
CPC .... H04L 1/1858; H04L 49/206; H04L 69/329
USPC ......................................... 370/259, 352, 401
See application file for complete search history.

(56) References Cited

U.S. PATENT DOCUMENTS

| | | | |
|---|---|---|---|
| 5,650,994 A * | 7/1997 | Daley ............................. | 370/259 |
| 5,740,075 A * | 4/1998 | Bigham et al. ................. | 709/229 |
| 7,779,162 B2 | 8/2010 | Wright et al. | |
| 7,826,356 B2 | 11/2010 | Ban et al. | |
| 7,835,374 B2 | 11/2010 | Diab et al. | |
| 7,990,905 B2 | 8/2011 | Lappetelainen et al. | |
| 8,078,944 B2 | 12/2011 | Cousins | |
| 8,179,910 B2 | 5/2012 | Diab et al. | |
| 8,310,920 B2 | 11/2012 | Goldfein et al. | |
| 2003/0043788 A1* | 3/2003 | Hasegawa et al. ............ | 370/352 |
| 2008/0183525 A1* | 7/2008 | Tsuji et al. ........................ | 705/7 |
| 2010/0232355 A1 | 9/2010 | Richeson et al. | |

OTHER PUBLICATIONS

Paper: J.S. Plank, "Optimizing Cauchy Reed-Solomon Codes for Fault-Tolerant Storage Applications", Univ. of Tennessee, Dept. of Computer Science, Knoxville, TN, Dec. 2005, 11 pages.

(Continued)

*Primary Examiner* — Wanda Z Russell
(74) *Attorney, Agent, or Firm* — Thomas Schneck (57) ABSTRACT

In a data transfer method and system for networks having gateway-mediated asymmetric transport, data and feedback channels are established between sender and receiver, along with a gateway feedback channel between gateway and sender. Cohorts of datagrams are transformed using fault-tolerant coding to create chapters whose size correspond to the asymmetric transport's timing. The sender transmits chapters in chunks at a rate to keep the gateway at an optimum fill for maximal throughput without transmit-end packet drops. The receiver reconstructs complete cohorts of original datagrams from a received subset of the transformed datagrams. The receiver acknowledges successfully recovered cohorts and identifies missing or corrupt datagrams of a chapter whenever recovery is unsuccessful. The sender resends sufficient lost datagrams to allow cohort recovery. The sender self-tunes its transmission rate based upon gateway fill, network latency and datagram loss rate to keep datagram loss rate below an upper bound.

12 Claims, 4 Drawing Sheets

(56) References Cited

OTHER PUBLICATIONS

Paper: J.S. Plank, "A Tutorial on Reed-Solomon Coding for Fault-Tolerance in RAID-like Systems", Univ. of Tennessee, Dept. of Computer Science, Feb. 19, 1999, 20 pages.

Paper: J.S. Plank et al., "Note: Correction to the 1997 Tutorial on Reed-Solomon Coding", Univ. of Tennessee, Dept. of Computer Science, Tech. Report UT-CS-03-504, Apr. 24, 2003, 6 pages.

* cited by examiner

FAULT-TOLERANT DATA TRANSMISSION SYSTEM FOR NETWORKS WITH NON-FULL-DUPLEX OR ASYMMETRIC TRANSPORT

TECHNICAL FIELD

The present invention relates to data transfers between sending and receiving devices in a networked environment where Reed-Solomon or other fault tolerant coding is used to generate chapters of encoded datagrams that allow recovery or reconstruction of lost datagrams, and in particular to such transfers where the underlying transport has non-full-duplex (e.g., half duplex) or other asymmetric characteristics.

BACKGROUND ART

Packet switched or network communications can be proxied through a gateway into an 'alien' transport, such as a half-duplex radio link or a high latency satellite connection, whereby the transport characteristics are modified away from the traditional full duplex communications commonly used for internet protocol suite (TCP/IP) networks. Many existing communications protocols like TCP/IP already suffer from transfer rate limitations due to network latency, traffic congestion and dropped datagrams or packets. Even though the gateways that manage half duplex transport use buffers intended to maintain the illusion of full duplex communication for the sender and receiver, the existence of asymmetric transport tends to increase latency and worsen the problem of dropped datagrams or packets.

In U.S. Pat. No. 8,310,920 to Goldfein et al., a system and method are disclosed that accelerate data transfers over a network even in the face of high latency and congestion. The sender will send as much data as it can as rapidly as possible so as to make maximum use of the available bandwidth. This is in contrast to any specific amount of bandwidth that the network or any of the network's nodes might attempt to allocate to any given sender. The sender sends datagrams continuously (with only small amounts of inter-datagram delay between contiguous datagrams) until the source of data is exhausted or until the sender is paused by the receiver. The sender thereby floods the transmission channel with traffic, taking all available bandwidth, with the aim of keeping the channel as full of data as possible so that there is always data ready for immediate acceptance by the receiver, even if the extra burden results in some dropped data that must subsequently be resent. In one embodiment, the '920 patent describes a protocol that employs fault-tolerant coding of chapters of datagrams, such as Reed-Solomon or similar error-correcting codes, to build in a level of redundancy in each encoded chapter, so that any lost (missing or corrupt) datagrams in a chapter, up to a specified loss rate, can be recovered from those encoded datagrams that do successfully arrive at the receiver end. This ability to reconstruct missing datagrams from a subset of encoded datagrams of a chapter minimizes the need for resending datagrams.

In addition to the data transmission channel, a separate feedback channel is also established between sender and receiver for reporting of synchronization messages (SYNs), acknowledgement messages (ACKs) and negative acknowledgments (NAKs) by the receiver, so the sender can determine network latency and the existence of any lost or corrupted datagrams that need to be resent. Periodic SYNs, as well as ACKs that supplement, replace or incorporate such SYNs once data transmission has begun, include a timestamp, and changes in timestamp differences are used by the sender as a measure of overall latency and network congestion to serve as one basis for tuning the data transmission rate. The sender tries to optimize the use of the available bandwidth capacity as defined by the bandwidth delay product. An optimum rate is defined as the highest rate the data can be transmitted and be successfully received and processed by the receiver with minimum data loss. The content of NAKs and ACKs allow the sender to determine the datagram loss rate in the data channel to serve as another basis for tuning the data transmission rate. Too little loss (or corruption) implies that datagrams can be sent more frequently, while too much loss results in too much retransmission. Hence an optimum data rate can be maintained by the sender setting an upper bound to the datagram loss rate.

The '920 patent's error-correcting-capable protocol makes use of a method described in U.S. Pat. No. 8,078,944 to Cousins which involves transforming groups of datagrams, called cohorts, using Galois field operations and a Vandermonde generator matrix to derive corresponding groups of output datagrams, called chapters, that have sufficient redundancy embedded within the reformulated data so that original data is recoverable even when less than all elements of a chapter are available. Specifically, when a cohort of W input datagrams are transformed into a chapter of H output datagrams, where H≥W, then all W original datagram files are recoverable from only W received datagrams of a chapter. Thus, provided not more than (H−W) datagrams of a chapter are lost or corrupted during transmission, the entire cohort of original data will be recovered. However, if the datagram loss rate is great enough such that fewer then W datagrams of a chapter are available, then none of the original data, not even small portions, will be recoverable.

In spite of the overall improvement in data transfer provided by the '920 patent's error-correcting-capable protocol, the possible existence of asymmetric transfer conditions invites further enhancements to take account of non-full-duplex throughput via a buffered gateway. During transmission periods of the asymmetric transport, the gateway's buffer will fill as the sender maximizes use of the available bandwidth. Peak throughput occurs when the buffer is close to being full. During back haul periods when the transport is not transmitting to allow traffic in the reverse direction, the gateway buffer will fill at a faster rate and will likely become completely full such that datagrams must be dropped before any can be transmitted. When the transport returns to a transmitting period, the buffer is already full so that datagram drops will continue if the sender continues to supply datagrams at the same high rate. Overall, the effective throughput under such asymmetric transfer conditions can be poor, despite the recovery ability of the redundant encoding of datagram chapters, due to the predominance of so many datagram losses, which may reach a level that prevents recovery and thereby requires retransmission of datagrams.

SUMMARY DISCLOSURE

A network transmission system can optimize data transfer rates if the sender is informed of the existence and timing characteristics of any non-full-duplex or otherwise asymmetric transport in the established data channel. Using that information, the sender will send groups of datagrams to the gateway in chapters whose size corresponds to that transport's timing. Additionally, a feedback channel can be established not only with the ultimate receiver but also with the intervening gateway to keep the gateway buffer at an optimum fill for peak throughput while minimizing dropping of datagrams by the gateway. Where the feedback channel also passes through asymmetric transport, a longer timeout period for acknowledgements can be established based on the transport's timing characteristics. Accordingly, a method is provided for transferring data between a sender and a receiver in a datagram-based network having asymmetric transport characteristics.

The method begins by establishing separate data and feedback channels over the network between the sender and the receiver, where at least a portion of one or both of the channels includes non-full-duplex or asymmetric transport mediated by a gateway in the network. The established channels also include a gateway feedback channel between the gateway and the sender. If the established receiver feedback channel passes through the asymmetric transport used by the established data channel, the receiver and gateway may share that feedback channel. However, the receiver feedback channel, being separately established and distinct from the data channel, need not pass through the asymmetric transport used by the data channel.

A processor implementing fault-tolerant coding divides a data set to be transmitted into cohorts of datagrams and converts each cohort of H original datagrams into corresponding chapters of W transformed datagrams, where W is greater than or equal to H. The conversion is such that a complete cohort of original datagrams is recoverable from any subset of at least H of the transformed datagrams that have been derived from that particular cohort.

The chapters of transformed datagrams are sent over the data channel from the sender to the receiver until a source of data is exhausted or paused by the receiver. The fault-tolerant chapters of datagrams are sent in temporal chunks containing one or more entire chapters, where the chapter size (W) corresponds to timing characteristics of the asymmetric transport (communicated via gateway feedback, third party feedback or based upon supplied information). The chapters are sent at a rate that keeps a buffer of the gateway at an optimum fill as maximal throughput without transmit-end packet drops.

The encoded chapters of datagrams allow the receiver to reconstruct complete cohorts of original datagrams even when only a subset of the transformed datagrams from a corresponding chapter successfully arrives at the receiver. Moreover, even where an insufficient number of datagrams from a chapter to allow recovery of the chapter have been received, a full set of the missing datagrams need not be resent, but only enough to reach the minimum needed to reconstruct the chapter. Thus, resending of datagrams is minimized.

The receiver sends messages over the (receiver) feedback channel to the sender. The messages acknowledge those cohorts of original datagrams that have been successfully reconstructed, and also, whenever a cohort cannot be recovered, identify the missing or corrupt datagrams from any missing or incomplete chapters. At least some messages further include timing information indicative of network latency and congestion. Based on the messages obtained over the receiver feedback channel, the sender will resend at least a specified number of datagrams over the data channel from the missing or incomplete chapters sufficient to allow cohort recovery.

The sender also self-tunes the sending or transmission rate of the chapters of datagrams in reaction to changing network conditions. The self-tuning will be based upon a combination of information about gateway buffer fill, network latency and datagram loss rate, as determined from the content of messages received over the feedback channels. The self-tuning is adapted to at least keep the datagram loss rate below a specified upper bound, while still trying to keep the gateway buffer at or near its optimal fill level during both transmitting and back haul periods of the asymmetric transport.

DETAILED DESCRIPTION

Enhancements to the current error-correcting-capable protocol take advantage of the controlled transmission rates under asymmetric transport conditions in several different ways, including by optimizing chapter size, controlling inter-chapter timing, and running on bare datagrams without internet wrapping overhead. Use of the forward error correction allows a sender unit to transport data in certain applications where it would otherwise be difficult in practice.

Chapter Size Optimizations

A first extension is to control the size of chapters (both number of datagrams and the size of datagrams) to allow it to work in greater harmony with the underlying transport equipment. Datagram size is controlled by channel maximum transmission unit (MTU) which may be a parameter of the Alien Transport. One implementation uses a 64×128 matrix in all cases.

For example, if it is determined that the datagrams must go through an intermediate gateway at each end, whereby the gateway effectively buffers the contents before retransmitting them, the size of the chapter could be optimized such that entire chapters can be transferred to the remote end as a single unit. (A pause or handshake between chapters would enhance this efficiency.) This reduces the buffering memory required and CPU effort on the part of the receiver. Furthermore, it eliminates a number of cases in which a subset of a chapter's datagrams are delayed and considered lost from the standpoint of the receiver algorithm.

In order to understand the relationship between optimum chapter size and the characteristics of the asymmetric transport and its gateway (transmit duration, back haul duration, gateway buffer size, etc.), as well as the relationship between gateway or transport datagram loss rates and the chapter size W and chapter/cohort size ratio (W/H), we start with the assumption that the transmitting device (sender unit) is connected to the gateway with a much faster connection than the gateway has to the asymmetric transport's corresponding receive-side gateway (which in turn is connected with a faster connection to the receiver unit). Another assumption is that, because of the half-duplex segment, the data channel is latency bound, meaning that the bandwidth delay product is such that a short message takes longer to travel between the sender and receiver units than simply defined by the bit rate of the connection. (In other words, it is possible to have data 'stored' in the channel.) Also, we assume that the transmitting gateway follows a strict in-order processing stream and drops all incoming datagrams once its buffer is full.

Starting with the extreme case wherein the sending unit transmits exactly one datagram (which would go through the transmit gateway, receive gateway and eventually arrive at the receiver unit) and waits for an acknowledgement message, when the round trip latency is bounded the sending unit will receive either an acknowledgment (ACK) message, a negative acknowledgment (NAK) or will timeout. The throughput in this extreme case is very poor. Increasing the transmit size to a group of two datagrams, the throughput essentially doubles but is still poor, with the majority of time being spent with no bits being transmitted due to the channel being latency bound. Much potential transfer capacity is going unused. Increasing the number of datagrams in the chapter to a transmit size of n before awaiting a reply results in a throughput that is n times that of the single datagram case, until the gateway buffer becomes full and begins dropping datagrams. (Note: for simplicity we view the gateway as waiting until its buffer is full then transmitting the contents of its buffer. In reality, the gateway simply buffers incoming datagrams on a 'space available' basis while continuing to transmit datagrams at full speed. Either assumption works for this example.) For some value of n the transmitting gateway's buffer becomes full with n−1 datagrams, forcing the last or $n^{th}$ datagram to be dropped. At this point our example system implementing a simplistic protocol breaks down, wherein the dropping of just a single datagram results in a timeout forcing the sending unit to retransmit the chapter of n datagrams endlessly.

Shifting now to a 'chapters' transmission model wherein the receiver unit reports the number of datagrams received after a suitable idle period (which in this case indicates either that the chapter has been transmitted in total or that some additional number of datagrams are required for chapter recovery), we choose a chapter size n that is comfortably contained in the transmit gateway's buffer and then again increase the chapter size to the point where the gateway beings to drop datagrams. The receiver's acknowledgement of m datagrams received causes the sender to simply retransmit the n−m datagrams identified as missing (or at least a subset of the same needed for the recovery of the original cohort of datagrams). As the chapter size n increases, the amount of buffering memory in the sender and receiver units increases and the number of lost datagrams needing to be retransmitted through the transmit gateway also increases, but the rest of the system is largely unchanged. Note that even in the case of some datagrams being dropped by the transmit gateway and associated inefficiencies, the actual throughput of the system is at or near maximum and essentially the same as for that value of n where no datagrams are dropped.

We now introduce a randomized datagram loss over the half-duplex segment of the channel and call the loss rate r, where this loss rate is the probability that a given datagram reaches the other end (zero for no loss increasing to one for total loss). For this discussion, we assume corrupted datagrams are discarded at the receiving entity (either the receiving gateway or the endpoint receiver unit) and so can be treated as equivalent to lost datagrams. To this point, we've had r=0. Now set r=1/n, where n is the chapter size such that the transmit gateway is not dropping any datagrams. In this situation, an average of one of the chapter's datagrams is lost before the receiver unit actually receives the chapter. The receiver unit acknowledges receipt of n−1 datagrams, identifies the lost datagram needing to be retransmitted, and the protocol therefor operates in a mode similar to when n is one past the size where no datagrams are dropped by the transmit gateway. However, here the overall throughput of the channel is now proportional to (n−1)/n since the transmit gateway is consuming n transmit slots but the receiver unit is only processing n−1 received datagrams. The problem cannot simply be rectified by increasing the chapter size n, due to transmit gateway limitations. However, if the chapter/cohort size ratio (W/H) is increased to at least n/(n−1), so that the receiver unit can still recover a complete chapter in spite of the projected single datagram loss per chapter, throughput is now improved because each chapter is processed in one transmit tenure.

A system employing this scheme for setting chapter size and chapter/cohort ratio operates in a much more efficient regime and requires fewer internal resources in the sender and receiver units. Because the receiver unit is able to successfully process entire chapters per transmission tenure, it no longer needs to buffer datagrams while waiting for missing datagrams to arrive in a subsequent transmit period. Likewise, the sending unit's redundant pool of sent datagrams can be emptied of a chapter's datagrams earlier, as an positive acknowledgment (ACK) message will be sent to the sender during the immediately following back haul period.

As the datagram loss rate r over the data channel grows toward 2/n, the optimal throughput will demand a corresponding increasing chapter/cohort size ratio, to n/(n−2) so as to be able to handle an average loss of two datagrams per chapter while still being able to recover a complete cohort from the datagrams that do arrive at the receiver unit. The shrinking cohort size from which the chapters of datagrams are derived is an acceptance of a lower peak throughput over the channel, but it also corresponds to achieving throughput which is near the new, lower optimal value.

Accordingly, chapter size n is chosen to avoid dropping of datagrams by the transmit gateway, while the amount of redundancy contained in a chapter, represented by the chapter/cohort size ratio (W/H), is chosen to be at least n/(n−nr)=1/(1−r), where r is the datagram loss rate over the data channel, so that complete cohorts can be successfully recovered in spite of the expected datagram losses.

Inter-Chapter Timing and Feedback

A second extension is to control the inter-chapter-transmit delay to improve transfers over half duplex or asymmetric channels. In the simplest case there could be a delay without feedback. In a more sophisticated case, the delay could be controlled by feedback from the system which could be anything from a threshold of available buffering memory or a signal that the previous chapter had been successfully transferred.

Discard TCP/IP and Run on Bare Datagrams

A third extension is to eliminate the entire wrapping protocol and to assume a virtual channel carrying nothing but datagrams between two points, perhaps over the alien transport mechanism. In this scenario, there is no need for the overhead of internet protocol (IP) or user datagram protocol (UDP). The Flume next-generation protocol provides all of the error checking and sequencing information required for proper decoding of information. (This is more of use in satellite links and equivalent.)

Error-Correction-Related Data Transport Applications

Use of Forward Error Correction (FEC) to transfer data and/or instructions to or from a semi-autonomous or fully autonomous vehicle, optionally through intermediate devices Use of FEC in a point-to-point link to transfer data and/or instructions to/from a semi-autonomous or fully autonomous vehicle Use of FEC to transfer data and/or instructions to or from a sensor or data gathering device, optionally through intermediate devices Use of FEC to transfer classified data/information/content Use in FEC of shared secret mode to provide part or all of the security for classified data transfer For example, a networking system may include one or more base stations B and one or more semi-autonomous or fully autonomous vehicles V communicating instructions and/or data with each other over one or more communications channels. One or more satellites might be part of the networking system, which could be considered either as base stations or 'vehicles' depending on whether or not it is in synchronous orbit. In any case, all devices whether stationary or not are treated as nodes in the network. Base station to vehicle instructions could include routing information or perhaps a 'return to base' command. Base to vehicle data could include map, weather, traffic or threat information, all of which could be regularly updated. Vehicle to base station instructions could include requests for updated information, as well as operational requests, such as requests for deviation from an assignment. Such vehicles may contain payload that originates instructions for the system. Vehicle to base station data could include return of sensor data (images, GPS location, etc.), operational data (e.g., fuel consumption) and other generated content. The vehicle payload may generate almost any type of data for transfer to the system. Instructions between vehicles could include location and collision avoidance information or any payload-related instructions. Vehicle-to-vehicle data could include any data (including payload-originated data) that may need to be forwarded to any part of the system. Any component in the system (base station or vehicle) may find it useful to use one or more other components as intermediate nodes to forward instructions or data to its ultimate destination.

The latency of communications between these components (base stations, vehicles and associated networked devices) may be quite large, depending upon the communications channels available. For example, if an immediately overhead satellite is used, then the minimum two-way latency is approximately:

$$\text{Delay}=c^{-1}[R^2+r^2-2Rr\cos\phi]^{1/2},$$

where c is the speed of light, R is the radius of the geoid, r is the orbital radius and $\phi$ is the angle between stations. For geostationary orbits, the delay is approximately 250 ms. Communications between nodes of the networked system may be further constrained through the use of various gateways, such as encryption and half-duplex adapters, which further distort or strain the communications model.

The operational cost of sending information from one node to another increases with delay. For example, telling a remote drone to turn to avoid an in-air collision is only helpful if the instruction arrives in time for the drone to take the required evasive maneuver. Insufficient redundancy in the FEC coded chapters may result in a need to resend missing datagrams for instruction recovery, which may arrive too late. The use of FEC with the proper amount of redundancy overhead will substantially increase the probability that the complete instruction will be received by the vehicle in time to be acted upon. Accordingly, selection of the amount of redundancy to be applied by the FEC coding should take into account the delay cost for the information being transmitted.

The potential need for retransmission requires that the sending node buffer all unacknowledged sent data in some way. However, buffering capacity of the various nodes in the network is finite. Given high data rates, potentially high data loss rates and large latencies, the amount of buffering required of the sender could become unacceptable. Use of FEC for data allows this problem to be mitigated by reducing effective loss rates.

Figure 1:
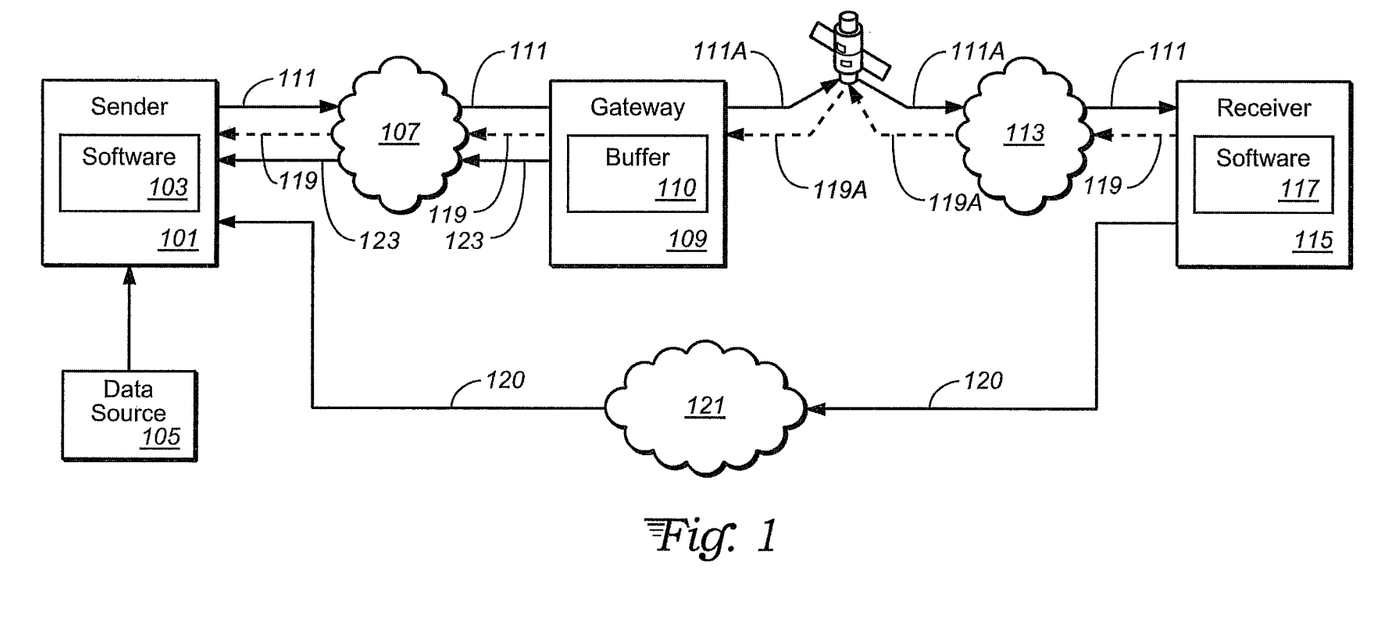
FIG. 1 is a schematic block diagram illustrating typical components of a data transmission system and network containing asymmetric transport over at least a portion of a data transmission pathway, which forms both the context and basic elements of the present invention.

With reference to FIG. 1, a data transmission system couples a sender 101 to a receiver 115 for data transfer over a network 107, 113 and 121. Sender 101 and receiver 115 have software, 103 and 117 respectively, loaded on their computer hardware for implementing a data transfer protocol in accord with the present invention. The sender 101 has access to a data source 105 storing data that may be transferred over the network in response to a request from the receiver 115.

A data channel 111 is established between the sender 101 and receiver 115 over some available pathway 107, 113 of the network. The data channel 111 is seen here to include a portion 111A with asymmetric (e.g., non-full-duplex) characteristics, such as a radio or satellite link. Such asymmetric characteristics are alien to the full-duplex data transfer characteristics typically used in data networks via TCP/IP or similar protocols. This asymmetric portion 111A of the data channel 111 is mediated by a gateway 109 that allows buffering of data with a buffer 110 so that the asymmetric portion 111A of the data channel will be as transparent as possible to data transfer operations.

In addition to a data channel 111, a separate feedback channel 119 or 120 is established between the receiver 115 and sender 101. The feedback channel 119 may use the same asymmetric pathway 119A as the data channel portion 111A or may be directed along a different pathway 120 of the network that does not have any asymmetric characteristics. In the present invention, the sender 101 makes use of timing characteristics of the asymmetric portion 111A of the data channel. These timing characteristics, as well as information about gateway buffer fill levels, are provided by the gateway 109 to the sender 101 via a gateway feedback channel 123, which could be separate from the receiver feedback channel 120 or could share the same feedback channel 119 as receiver 115.

Figure 2:
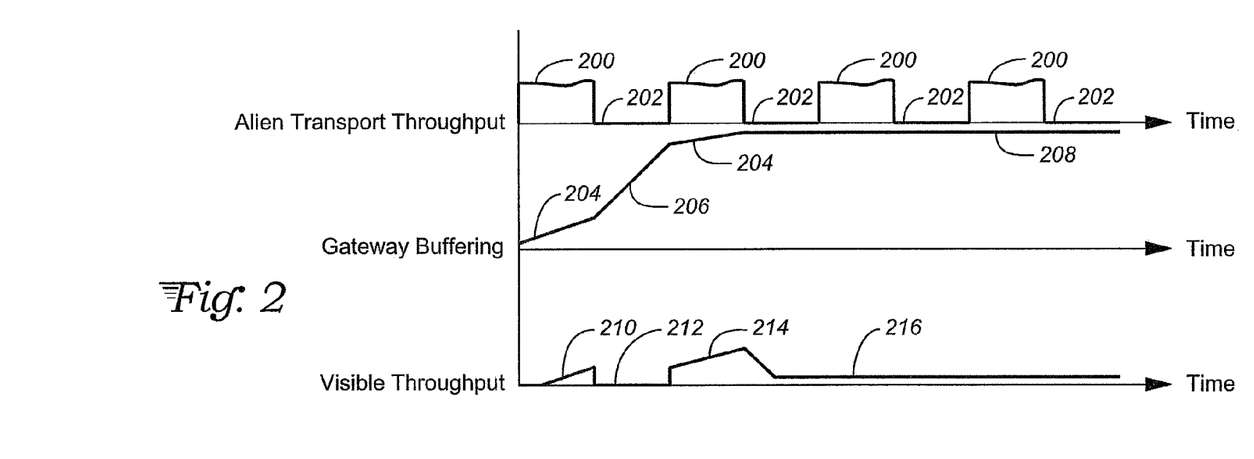
FIG. 2 is a timing diagram illustrating prior art data transmission over a network like that in FIG. 1 but without the elements of the present invention.

With reference to FIG. 2, if data transfer were to be carried out according to prior art transfer protocols, the timing through the gateway and asymmetric portion of the data channel would typically take place as shown. In particular, the gateway manages half-duplex transport and buffer reverse traffic in such a way as to maintain the illusion of full duplex communications. When a sender begins to transmit data over an established data channel of the network, the gateway's buffer ideally should fill during back haul periods and empty during transmitting periods of the asymmetric transport portion. However, under conditions where a sender is operating under more aggressive transfer protocol, such as that which is described in the aforementioned U.S. Pat. No. 8,310,920, it may be difficult for the sender to self-tune the data sending rate to keep loss of datagrams below a specified rate. To understand this, the top line of FIG. 2 shows the regularly alternating transmitting periods 200 and back haul periods 202 of data transfer through the asymmetric transport portion of the data channel. The second line of FIG. 2 shows the buffer fill level of the gateway buffer. It can be seen that under aggressive transport protocols the buffer fills both during the back haul and transmit periods 202 and 200. It simply fills more slowly during transmit periods, as shown where indicated by reference numeral 204, and more rapidly during back haul periods as indicated by reference numeral 206.

Fairly quickly, the buffer becomes completely full (at 208), such that continually arriving datagrams cannot be handled and must be dropped from the buffer. The bottom line in FIG. 2 shows the apparent throughput observed by the sender through ACK and NAK messages obtained as feedback from the receiver. Throughput rises during initial transmit periods 210 as the buffer begins to fill, is of course zero during back haul periods 212, and peaks during transmit periods 214 when the buffer is close to, but not completely, full (i.e., near an optimum fill level). However, once the gateway buffer is completely full and is forced to drop datagrams in one or more subsequent back haul periods, effective throughput is seen by the sender to be close to zero even during transmit periods 216 because dropped datagrams begin to be reported as missing when datagram discards become predominant. The sender spends more time filling resend requests than it does sending new datagrams.

The aggressive error-correcting-capable data transfer protocol is here modified and extended to better function in the specific environment where the underlying transport is half duplex or has asymmetric characteristics. The modifications and extensions allow a sender 101 to synchronize its transmissions over the data channel 111 and 111A with the buffering in the gateway 109 such that datagrams are not discarded. There are several ways in which this goal is accomplished:

"Chunking" of datagrams into groups of entire chapters of datagrams and temporally separating chunk transmission.

Use of feedback from gateway to control EF's transmission rate.

Use of more global feedback from alien transport to control transmission rate.

Furthermore, the delays involved in such an alien transport may cause some datagrams to appear to be unacknowledged for very long periods of time. There are several ways to address this including:

Basing 'timeout' upon knowledge of the alien transport's timing characteristics

Redefining the concept of a dropped datagram so as to be based upon the chunking.

Adding protocol support to reserve resources at the gateways such that buffering will never be overrun.

The retransmission schedule for EF could be modified so as to place retransmitted datagrams at the beginning of each transmit period in order to minimize memory consumption on the receiver.

Figure 3:
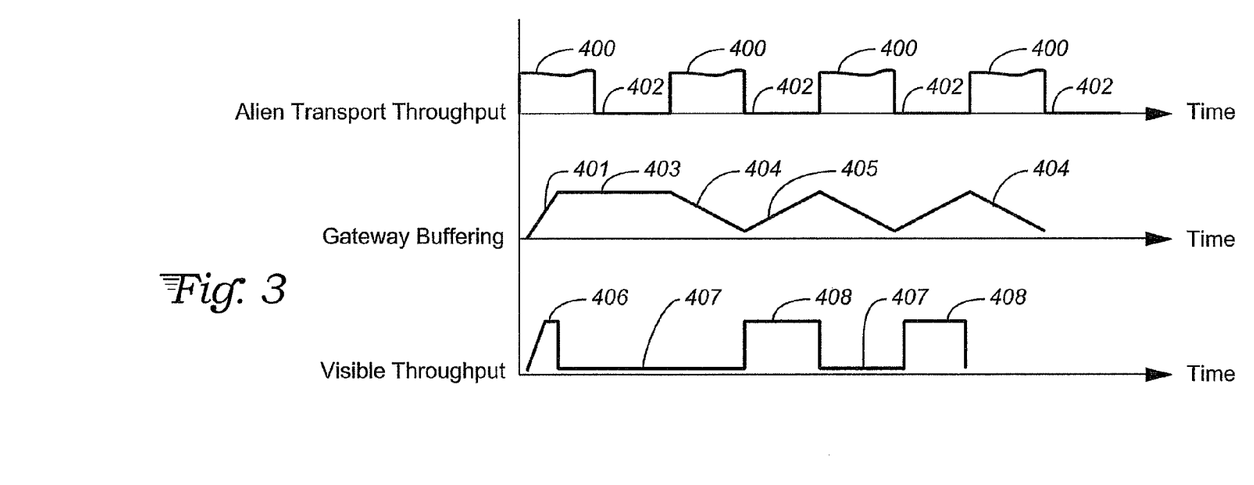
FIG. 3 is a block flow diagram illustrating steps carried out by a data transmission system in accord with the present invention.

With reference to FIG. 3, data transfer between a sender unit at a first endpoint of a datagram-based inter-network and a receiver unit at a second endpoint in the datagram-based network begins by establishing separate data and feedback channels over the network between the sender and receiver (step 301). Both sender and receiver cooperate in establishing such channels and, until such time as the data transfer session is complete, both sender and receiver units remain coupled to those established channels. Each channel comprises at least one path over the network.

While inter-networks typically employ full duplex communication, it may occur that some portion of a path on one or both of the established channels includes a non-full-duplex or otherwise asymmetric transport characteristic, such as communication over a radio or satellite link, which is mediated via a gateway in the network. Accordingly, once the channels are established, the sender unit endeavors to determine whether or not there is such a gateway in the network path of either or both channels (step 302). A gateway cannot be 100% transparent in all measurable dimensions. Instead, a gateway's purpose is to preserve transparency along well established or primary dimensions. The sender unit can determine the presence of a gateway by simply noticing a change in secondary characteristics of an established channel. An example of this is with a virtual private network (VPN), which though largely transparent, typically comes at the price of performance and often with a change in the maximum transmission unit (MTU) for the virtual network.

Accordingly, if the determination is that there is no gateway or asymmetric transport portion in either established channel, data transmission can proceed (e.g., step 307) according to an existing protocol (such as the Flume protocol described in U.S. Pat. No. 8,310,920 described above). Likewise, if only the feedback channel passes through such a pathway of the network, it is of little consequence and an existing protocol can likewise be employed, if desired.

On the other hand, if the data channel or both channels pass through a gateway mediating asymmetric data transfer, certain information will be required of the gateway for the sender unit to implement the present invention. Accordingly, either the same or a different feedback channel will be established between the sender and gateway for obtaining such information. If the already established feedback channel already passes through the gateway, such channel can be allowed to be shared with the gateway (step 303). If the established feedback channel does not pass through the gateway (since it is separately established it may have a different path through the network than the data channel), a separate gateway feedback channel will be established (step 304) in addition to the already existing receiver feedback channel.

Timing characteristics of the asymmetric transport portion of the channel(s) are communicated by the gateway to the sender unit (step 305). Such timing characteristics may include information regarding the respective time durations of alternating transmit and back haul periods of the asymmetric transport, synchronization information such as latency from sender to gateway, and latency through the asymmetric transport. The information can take many forms—from media access control (MAC) level flow control information to simple network management protocol (SNMP) management information base (MIB) information which indicates the gateway device's configuration. As there is currently no standard, and we cannot assume that the gateway is running any software specific to the present protocol, the sender unit must be sufficiently resourceful so as to be capable of recognizing the various possible forms of communicated timing characteristics. While we can foresee the possibility in the future of an intermediate node having software specific to the protocol and functioning like a gateway, at present the protocol works best when the sender and receiver units are the only nodes in the established channel pathways of the network that are cognizant of the gateway's existence.

The sender unit has a processor that divides a data set to be transmitted into cohorts of datagrams and converts each cohort of H original datagrams into corresponding chapters of W transformed datagrams, where W is greater than or equal to H. The conversion is such that a complete cohort of original datagrams will be recoverable by the receiver unit from any subset of at least H of the transformed datagrams that have been derived from that particular cohort. Thus, dropping or other loss of some datagrams during transmission will usually allow recovery of complete cohorts of datagrams in spite of that loss due to the redundancy introduced by the chosen fault-tolerant transformation. The processor operations of the both the sender and receiver unit are described in greater detail below.

The sender unit proceeds to send complete chapters of transformed datagrams over the data channel to the receiver unit until a source of data is exhausted or until paused by the receiver. Where, as here, the data channel includes an asymmetric transport portion mediated by a gateway, the datagrams are sent in temporal chunks corresponding to the timing characteristics of the asymmetric transport (step 306), where each chunk contains one or more entire chapters. Thus, chunks of datagrams will only be sent for a duration corresponding to the transmit period of the asymmetric transport and then be dormant for a duration corresponding to the back haul period. Synchronization of the sending can lead the transmit period such that the gateway buffer is already optimally filled when each transmit period starts. It is possible to develop a timing-based relationship analogous to a phase-locked loop. If there is MAC-level feedback, then the sender unit can allow the gateway to tune the relationship. If there is no explicit feedback, the sender unit can use higher-level analytical tools to identify patterns to data drops. Consistent gateway buffer overflows will result in predictable lost datagrams. The period and number of these losses, as reported by NAKs from the receiver unit, will provide the required feedback information, which when analyzed allow the sender unit to adjust the timing of its transmissions so as to avoid these predictable losses.

When receiving feedback from the gateway, the gateway buffer fill level (which may also include a measure of remaining gateway buffer space) is periodically communicated to the sender (step 308). In this way, the sender unit can self-tune the sending rate in order to keep the gateway buffer at or near an optimum fill to minimize dropping of datagrams and make full use of each transmit period.

The receiver unit identifies received datagrams and regularly reports successful recovery of cohorts of datagrams to the sender by means of periodic acknowledgement messages (ACKs). The receiver also identifies any missing or incomplete chapters with insufficient datagrams for cohort recovery together with a list of missing or corrupt datagrams from any such chapters and, as needed, sends negative acknowledgments (NAKs) to the sender over the established feedback channel. (Step 309)

For example, one manner in which datagram transmission and receipt can be tracked involves assigning of sequence numbers to chapters and their respective datagrams according to the order in which they have been derived by the sender from source data. Periodic ACKs from the receiver report the highest consecutive sequence number for datagrams received to date and successful recovery of cohorts of original datagrams. With such ACK information, the sender unit need only retain those sent datagrams in a condition available for immediate resending that have not yet been acknowledged. Once an ACK message acknowledges successful receipt, those datagrams with sequence numbers less than or equal to the reported sequence number can be removed from a sender buffer. Datagrams not received that are part of successfully recovered cohorts can also be dropped since they won't be needed.

Likewise, sequence numbers allow a receiver to identify those datagrams that are received out of order with intervening missing datagrams, and to identify any datagrams which arrive corrupted. Whenever a cohort of original datagrams cannot be recovered from those received datagrams of a chapter, a NAK message reports the identity of the missing or incomplete chapter and the identity of missing or corrupted datagrams from that chapter. Whenever the sender determines that a NAK message has been received (step 310), the sender immediately resends in the next datagram chunk (step 306) at least a specified number of those datagrams identified in that NAK (step 311) that will allow recovery of the corresponding cohort. The datagrams being resent could be all transformed datagrams of the chapter, just those datagrams identified as missing or corrupt, or a subset of those missing or corrupt datagrams. The sender unit can take advantage of known datagram loss rates to resend only as many missing datagrams as will assure recovery.

The sender regularly self-tunes the sending rate in reaction to changing network conditions. Such self-tuning is based upon a combination of factors, including gateway buffer fill (to maintain the fill level at an optimum level), network latency and datagram loss rate (to maximize use of available bandwidth). These factors are determined from the content of the messages received over the receiver feedback channel and gateway feedback channel, whether separate or shared. Thus, network latency may be determined from timing information reported back on periodic SYN messages or in ACK messages. (For example, sent datagrams may have a sender timestamp and their arrival time recorded by the receiver. Changes in the time difference can then be reported. Alternatively, if the feedback channel uses the same network pathway as the data channel, the SYN and ACK messages themselves may be time-stamped.) Datagram loss rate, from any source—including any drops by the gateway buffer—can be determined from arriving NAK messages. The sender's self-tuning of the data send rate is adapted to at least keep a datagram loss rate below a specified upper bound.

There are two classes of adaptations of the self-tuning due to the presence of asymmetric transport in the channels: symmetric timing and asymmetric timing. In symmetric timing (analogous to a stoplight), the sender unit simply has to wait its turn to transmit to avoid overfilling the gateway's transmit buffer. In asymmetric timing, we model the amount of transmit time required versus the receive time so that we can allocate the optimal amount of time. (In this latter case, the receiver unit has every reason to keep its reply windows small so that there will be no wasted reply time in the gateway.)

The sender (and receiver) units can adapt to the inherently long latencies in many asymmetric transports by lengthening the timeout period according to the timing characteristics information received from the gateway (step 305). This will prevent either unit from giving up prematurely on receipt of datagrams or of ACK messages from the other unit at the endpoints of the established channels.

Figure 4:
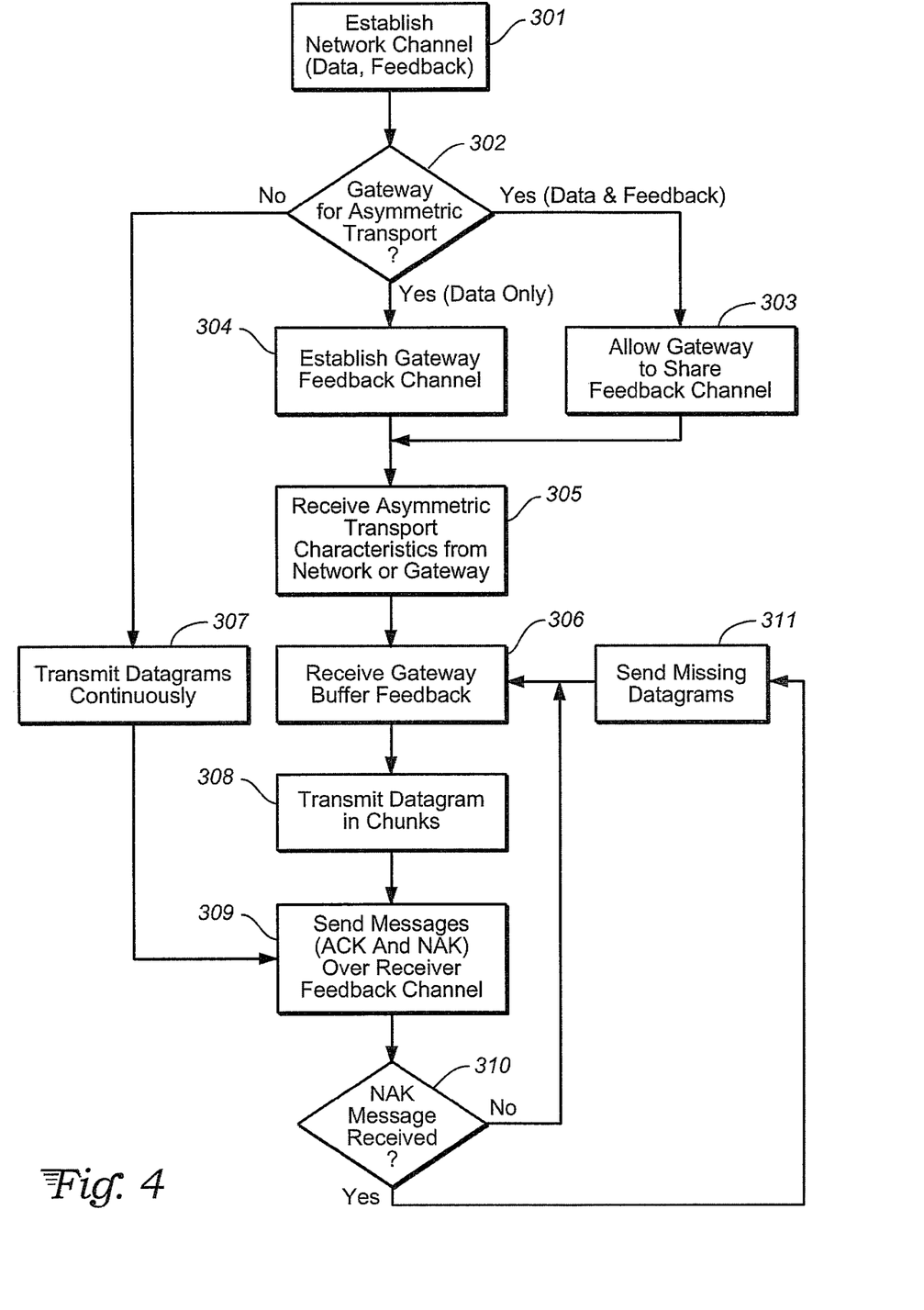
FIG. 4 is a timing diagram, like that of FIG. 2, but illustrating data transmission over a network like that in FIG. 1 with the elements of a data transmission system in accord with the present invention.

With reference to FIG. 4, the first row shows the asymmetric transport throughput with alternating transmitting and back haul periods 400 and 402. This is the same as in FIG. 2. During transmit periods 400 the gateway allows only outgoing transmissions, while during the back haul periods 402 the gateway allows only incoming transmissions. The second row shows the gateway buffering level when the present invention is implemented. During the initial transmit period 401 the gateway buffer is filled quickly. The buffer remains full (at 403) during the remainder of the transmit period and the subsequent back haul period until transmission is again allowed. The buffer drains slowly during transmission period 404 and may be at or near empty at the end 405 of the transmit window. It will subsequently refill and drain cyclically. Note that the buffer does not become completely full, thereby avoiding dropping of datagrams. The third row shows the overall throughput of data as seen by the sender. At the beginning 406, the sender unit transfers one buffer full of data quickly. Then, it waits (during period 407) for the buffer to empty. The sender periodically quickly refills the buffer (during periods 408) with intervening wait periods. Depending on the latency between the sender and gateway, the transmit periods 408 of the sender unit need not coincide exactly in time with either transmit or back haul periods 400 or 402 of the gateway, but once established, a cyclical transmission pipeline will tend continue until the source of data is exhausted. Due to changing network conditions, the sender unit will continually self-tune or adjust its transmission timing, so the cycles (407 and 408) will usually not be precisely periodic.

Error-correction Coding and Recovery p8v API

The sender unit includes a processor that carries out the required transformation of a cohort datagrams into a fault-tolerant form. In particular, a cohort of H original datagrams is converted into a corresponding chapter of W transformed datagrams, where the original cohort can be recovered from any subset of H transformed datagrams from the corresponding chapter. The transformation may be Reed-Solomon coding, or can be some other fault-tolerant coding that introduces sufficient redundancy of information into the transformed datagrams to permit recovery of original datagrams. One such procedure is described in U.S. Pat. No. 8,078,944 to Cousins. A library to carry out such a transformation is described in what follows:

Key Terms

Width—The number of bytes consumed by the library and the minimum number of outputs required to recreate the input.
Height—the number of outputs created.

INTRODUCTION

The library contains the required routines to use the error-correcting-capable protocol in $GF(2^8)$. There are at least two basic tasks for the library:
1. Write Operations: Conversion of plaintext to information space
2. Read Operations: Conversion of information space data back to plaintext A third possible operation (not described here) is recoding, wherein information space data a first width can be converted into wider information space data.

The library must be initialized by calling p8v_init ( ) before it may be used. Once initialized, an object-oriented interface is supplied, based upon the concept of an abstraction called a handle. The normal operational mode is to ask the library to create a handle of the desired type, then use the handle as many times as needed, then to free the handle. In some cases, a handle may be customized after creation.

Write Operations

The first step is to get a writer handle by calling p8v_writer_handle (width, height, secure). Width corresponds to the width of the generator matrix and specifies the number of input bytes which will be processed by the library each pass. Height specifies the number of output bytes produced each pass. As discussed elsewhere, height≥width. Furthermore, during the read or recovery phase, at least width inputs will be required to correctly recreate the input data.

When the handle is no longer required, it is freed using the call p8v_writer_free ( ).

Data can be converted through the use of two different calls. The simplest is p8v_from_plaintext (handle, source [width], destination[height]). This routine takes width bytes from the source byte array and produces height bytes of output. (Normally, each of the output bytes would be sent to a different file or stream.) This routine is general purpose and of adequate performance for most situations. However, in the case of modern CPUs, SIMD instructions make possible a much faster method so a second routine is available: p8v_simd_from_plaintext (handle, source[width], destination[padded_height]). In this situation, padded_height is a value ≥ to height but corresponds to a multiple of the SIMD stride size. For example, on most 64-bit CPUs, the stride size will be 8, so padded_height will be height rounded up to the next multiple of 8. The application must be prepared for the p8v library to write values all the way through padded_height without allowing other data structures to be corrupted.

Figure 5:
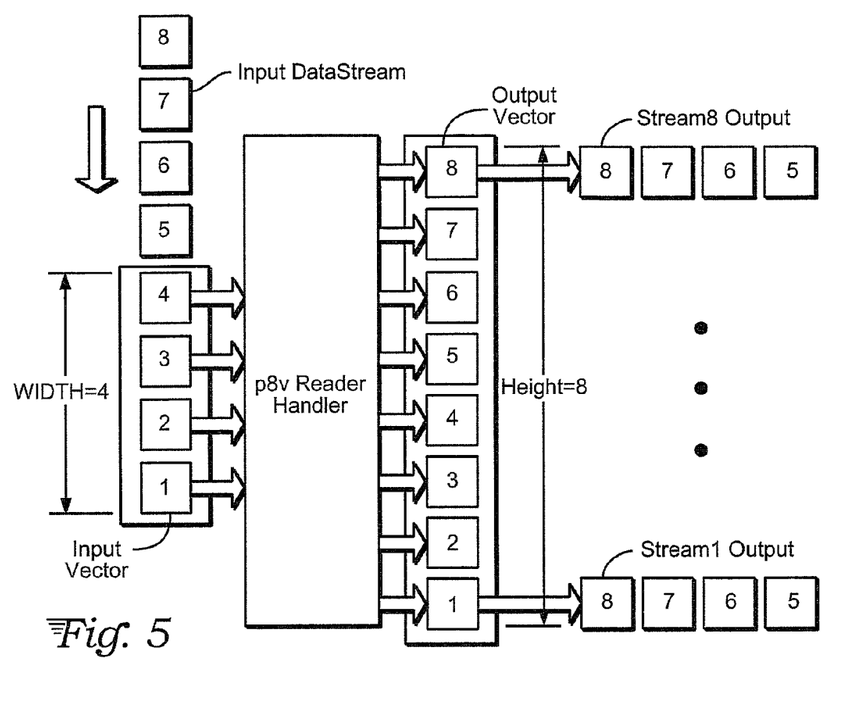
FIGS. 5 and 6 are schematic block diagrams showing operation of respective sender and receiver unit processors for implementing fault-tolerant coding and recovery in accord with the present invention.

The diagram shown in FIG. 5 shows an example with WIDTH=4 and HEIGHT=8.

Read Operations

Read operations are analogous to, but more complex than Write operations. It is not possible to tell a priori which data streams have been lost, so the read handle must be customized to reflect which streams are present. The handle is created by specifying simply the width: p8v_reader_handle (width, 0). The remaining information must be filled in later.

Once the surviving streams are known by number, then the handle must be customized. The first step is to reset the internal state using the call p8v_reader_reset (handle). Next, for each input stream up to width, the program must call p8v_reader_add_row (handle, stream). The first call indicates which stream number will be in location 0 in the input vectors during conversion back to plaintext. The second call specifies which stream will be in location 1 and so on.

Once all width entries have been specified, then the solution must be created using p8v_reader_gen (handle). This routine performs the required calculations, generates the required cheat tables, etc. It can take a while.

Once the solution is generated, then the user can call p8v_to_plaintext (handle, source[width], destination[width]) or p8v_simd_to_plaintext (handle, source[width], destination[padded_width]).

Figure 6:
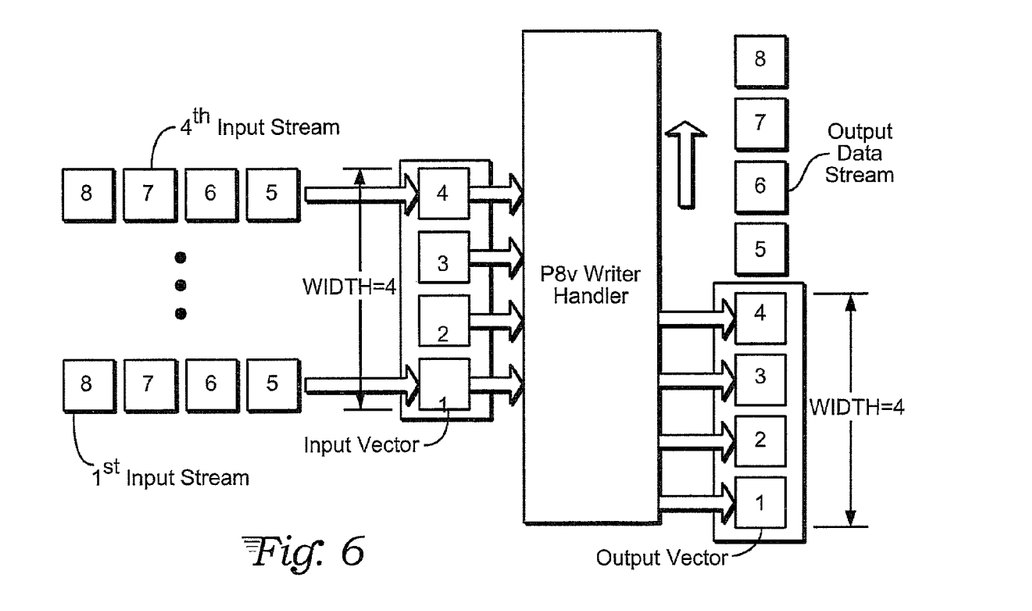

The Read handle is destroyed with a call to p8v_reader_free (handle). The operation of a writer handle is shown in FIG. 6.

A Worked Example

The following output from a program p8v_example.c shows one way to use the routines in the p8v library.
\* \* \* Initialization \* \* \*
Initialization involves simply:
res=0=p8v_init( )
Any non-zero return value is an error.
At this point, the p8v subsystem is initialized and ready to use.
\* \* \* Writer Operation \* \* \*
Writer functions enable the translation from plaintext to information space. The key is to create a suitable writer handle. Then use the handle to call other library functions.
write_handle=p8v_writer_handle (width, height, 0)
Where 'width' specifies the minimum number of pieces required for recovery and 'height' specifies the number of pieces to create. ('height'>'width')
Once the handle is created, it can be used by the two key routines as shown in the example below:
Assume unsigned char iv[4]=0x1, 0x2, 0x3, 0x4
Then the conversion process is:
res=0=p8v_from_plaintext(wh, iv, ov);
Where the output is
unsigned ov[8]=0x4, 0x29, 0x34, 0x24, 0x71, 0xcc, 0x81, 0x39
This output contains the same information as the input, but it is spread at the sub-bit level. This is called 'information space'. In this case, any four of the output values enable the recovery of the original input values.

\*\*\* Reader Operation \*\*\*

Reader functions enable the translation from information space to plaintext.

The recovery process is dependent upon which information space components are available. This makes the recovery process somewhat more complex.

The first step is to create a suitable reader handle. Then use the handle to call other library functions.

read_handle=p8v_reader_handle (width, 0)

Where 'width' specifies the minimum number of pieces required for recovery. Note: This 'width' specifies how many pieces to use, but not which ones.

Once the handle is created, it must be specialized for the specific pieces to be used in the recovery. Let us assume that we only wish to use the odd values from ov[ ] above.

unsigned iv[4]=0x29, 0x24, 0xcc, 0x39

Note: This means that we are using output pieces {1, 3, 5, 7} in that order.

Now to build the recovery model.

Reset the handle to start the process:

p8v_reader_reset(rh);

Now specify that the leftmost byte in the input vector corresponds to piece 1:

p8v_reader_add_row(rh, 1);

The next byte in the input vector is from 3:

p8v_reader_add_row(rh, 3);

The next byte in the input vector is from 5:

p8v_reader_add_row(rh, 5);

The next byte in the input vector is from 7:

p8v_reader_add_row(rh, 7);

At this point, the model has all of the required information, so the model can be generated:

res=p8v_reader_gen(rh);

Now the handle can be used by the two key recovery routines as shown in the example below.

Then the conversion process is:

res=0=p8v_to_plaintext(rh, iv, ov);

Where the output is:

unsigned ov[4]=0x1, 0x2, 0x3, 0x4

This output contains the same information as the input.

Had the inputs been scrambled such that the order of the inputs was {3, 5, 1, 7}, the process would have had to reflect this ordering:

unsigned iv[4]=0x24, 0xcc, 0x29, 0x39

Now to build the recovery model.

Reset the handle to start the process:

p8v_reader_reset(rh);

Now specify that the leftmost byte in the input vector corresponds to piece 3:

p8v_reader_add_row(rh, 3);

The next byte in the input vector is from 5:

p8v_reader_add_row(rh, 5);

The next byte in the input vector is from 3:

p8v_reader_add_row(rh, 1);

The next byte in the input vector is from 7:

p8v_reader_add_row(rh, 7);

At this point, the model has all of the required information, so the model can be generated:

res=p8v_reader_gen(rh);

Now the handle can be used by the two key recovery routines as shown in the example below.

Then the conversion process is:

res=0=p8v_to_plaintext(rh, iv, ov);

Where the output is:

unsigned ov[4]=0x1, 0x2, 0x3, 0x4

This output contains the same information as the original input.

For high performance situations, it may be useful to use the SIMD extension routines which can boost conversion throughputs dramatically by taking advantage of CPU-specific features.

What is claimed is:

1. A method of transferring data between a sender and a receiver in a datagram-based network, comprising:

establishing separate data and feedback channels over the network between the sender and receiver, at least a portion of one or both of the channels including non-full-duplex or asymmetric transport mediated by a gateway in the network, the established channels also including a gateway feedback channel between the sender and the gateway;

dividing a data set to be transmitted into cohorts of datagrams and converting each cohort of H original datagrams into corresponding chapters of W transformed datagrams, where W is greater than or equal to H, the conversion being such that a complete cohort of original datagrams is recoverable from any subset of at least H of the transformed datagrams that have been derived from that cohort;

sending chapters of transformed datagrams over the data channel from the sender to the receiver until a source of data is exhausted or paused by the receiver, the chapters of datagrams being sent in temporal chunks corresponding to timing characteristics of the asymmetric transport, each chunk containing one or more entire chapters, the chunks being sent at a rate that keeps a buffer of the gateway at an optimum fill as determined by feedback from the gateway;

sending messages over the feedback channel from the receiver to the sender acknowledging that cohorts of original datagrams have been successfully recovered, and identifying any missing or incomplete chapters with insufficient datagrams for cohort recovery together with a list of missing or corrupt datagrams from any such chapters, the messages further including timing information indicative of network latency and congestion;

resending over the data channel at least a specified number of datagrams from the list for a missing or incomplete chapter which will be sufficient to allow cohort recovery; and self-tuning by the sender of the sending rate in reaction to changing network conditions based upon a combination of gateway buffer fill, network latency and datagram loss rate as determined from the content of the messages received over the receiver feedback channel and gateway feedback channel, the self-tuning adapted to at least keep a datagram loss rate below a specified upper bound.

2. The method as in claim 1, wherein the receiver feedback channel is established through the asymmetric transport mediated by the gateway, and the receiver and gateway share the receiver feedback channel such that the gateway feedback channel is the same as the receiver feedback channel.

3. The method as in claim 1, wherein the receiver feedback channel does not pass through the asymmetric transport used by the established data channel.

4. The method as in claim 1, wherein each datagram includes an assigned sequence number indicating an order in which it has been derived from source data, the messages from the receiver including periodic acknowledgements (ACKs) reporting the highest consecutive sequence number of datagrams successfully received to date.

5. The method as in claim 4, wherein the messages from the receiver further include, whenever a datagram is received out of sequence or is corrupt, corresponding negative acknowledgements (NAKs) notifying the sender of sequence numbers of missing or corrupt datagrams not yet successfully received.

6. A system of transferring data between a sender at a first endpoint and a receiver at a second endpoint in a datagram-based inter-network, the system comprising:
- a processor implementing fault-tolerant coding of datagrams, the processor dividing a data set to be transmitted into cohorts of datagrams and converting each cohort of H original datagrams into corresponding chapters of W transformed datagrams, where W is greater than or equal to H, the conversion being such that a complete cohort of original datagrams is recoverable from any subset of at least H of the transformed datagrams that have been derived from that cohort;
- wherein the processor configuring a data channel to transmit chapters of transformed datagrams over at least one path of the inter-network;
- wherein the processor configuring a feedback channel separate from the data channel to transmit messages over the inter-network, the messages including acknowledgement messages (ACKs) that acknowledge successful recovery of cohorts of original datagrams and also including negative acknowledgements (NAKs) that identify any missing or incomplete chapters with insufficient datagrams for cohort recovery together with a list of missing or corrupt datagrams from any such chapters, at least some messages periodically including timing information indicative of network latency and congestion;
- a gateway in at least one path of least the data channel in the inter-network, the gateway configured to mediate non-full-duplex or asymmetric transport of datagrams over the at least one path, the gateway having a buffer for datagrams transmitted over the data channel, the gateway further configured to provide timing characteristics of the asymmetric transport and report a buffer fill level over the same or a different feedback channel;
- a sender unit coupled to the data channel and the feedback channel, the sender configured to establish the respective channels, send chapters of transformed datagrams over the data channel to the receiver until a source of data is exhausted or paused by a receiver unit, and resend at least a specified number of datagrams from the list included in any NAK message for a missing or incomplete chapter which will be sufficient to allow cohort recovery, the datagrams being sent in temporal chunks corresponding to timing characteristics of the asymmetric transport, each chunk containing one or more entire chapters, the chunks being sent at a rate that keeps a buffer of the gateway at an optimum fill as determined by feedback from the gateway, the sender also configured to self-tune the sending rate of chunks of datagrams in reaction to changing network conditions to optimize throughput based upon a combination of gateway buffer fill, network latency and datagram loss rate as determined from the content of the messages received over the receiver feedback channel and gateway feedback channel, the self-tuning adapted to at least keep a datagram loss rate below a specified upper bound; and
- a receiver unit coupled to the data channel and the feedback channel, the receiver configured to establish the respective channels with the sender unit, to receive transformed datagrams over the data channel, recover cohorts of original datagrams from the received datagrams of corresponding chapters, send both ACK messages at predetermined intervals and NAK messages as needed to the sender over the feedback channel.

7. The system as in claim 6, wherein the feedback channel is established through the asymmetric transport mediated by the gateway, and the receiver unit and gateway share the feedback channel.

8. The system as in claim 6, wherein the feedback channel does not pass through the asymmetric transport used by the established data channel and a separate gateway feedback channel is also established over the inter-network between the gateway and sender unit.

9. The system as in claim 6, wherein each datagram includes an assigned sequence number indicating an order in which it has been derived from source data, the periodic acknowledgement messages (ACKs) from the receiver unit reporting the highest consecutive sequence number of datagrams successfully received to date, the sender unit configured to track sent datagrams and to retain the sent datagrams available for resending until acknowledged by an ACK message.

10. The system as in claim 9, wherein the messages from the receiver unit further include, whenever a datagram is received out of sequence or is corrupt, corresponding negative acknowledgements (NAKs) notifying the sender unit of sequence numbers of missing or corrupt datagrams not yet successfully received, the sender unit configured to resend, as part of one or more chunks, those datagrams that have been identified by a NAK.

11. The system as in claim 6, wherein the datagram-based inter-network comprises point-to-point links between one or more base stations and one or more vehicles, each having both sending and receiving units therein and configured to communicate instructions and or data by means of the fault-tolerant coded chapters of datagrams.

12. The system as in claim 11, wherein one or more base stations and vehicles also serve as intermediate devices in the inter-network for relay of the chapters of datagrams.

* * * * *